United States Patent
Hu (10) Patent No.: US 11,216,033 B2
(45) Date of Patent: Jan. 4, 2022

(54) AUXILIARY SYSTEM AND METHOD IMPLEMENTED IN ELECTRONIC DEVICE

(71) Applicant: Mobile Drive Technology Co., Ltd., New Taipei (TW)

(72) Inventor: Shao-Jia Hu, Shenzhen (CN)

(73) Assignee: Mobile Drive Netherlands B.V., Amsterdam (NL)

( * ) Notice: Subject to any disclaimer, the term of this patent is extended or adjusted under 35 U.S.C. 154(b) by 0 days.

(21) Appl. No.: 16/246,464

(22) Filed: Jan. 12, 2019

(65) Prior Publication Data
US 2019/0235575 A1 Aug. 1, 2019

(30) Foreign Application Priority Data

Jan. 12, 2018 (CN) .......................... 201810034478.4

(51) Int. Cl.
| | |
|---|---|
| *G06F 1/16* | (2006.01) |
| *G06F 9/54* | (2006.01) |
| *G06F 3/0484* | (2013.01) |
| *G06F 3/0488* | (2013.01) |

(52) U.S. Cl.
CPC ........ *G06F 1/1643* (2013.01); *G06F 3/04842* (2013.01); *G06F 3/04883* (2013.01); *G06F 9/542* (2013.01)

(58) Field of Classification Search
CPC .... G06F 1/1643; G06F 9/542; G06F 3/04842; G06F 3/04883
See application file for complete search history.

(56) References Cited

U.S. PATENT DOCUMENTS

| | | | |
|---|---|---|---|
| 9,800,525 B1* | 10/2017 | Lerner .................. | H04L 51/36 |
| D806,705 S | 1/2018 | Akana et al. | |
| 2006/0253788 A1* | 11/2006 | Uotila ..................... | G06F 9/451 |
| | | | 715/762 |
| 2011/0154228 A1* | 6/2011 | Kinoshita ............. | G06F 3/0488 |
| | | | 715/763 |
| 2014/0306899 A1* | 10/2014 | Hicks .................. | G06F 3/04812 |
| | | | 345/173 |
| 2016/0259544 A1* | 9/2016 | Polikarpov ........... | G06F 3/0412 |
| 2017/0251114 A1* | 8/2017 | Ichiyama ........... | H04N 1/00506 |

FOREIGN PATENT DOCUMENTS

| | | |
|---|---|---|
| CN | 106462413 A | 2/2017 |
| CN | 107315583 | 11/2017 |

\* cited by examiner

*Primary Examiner* — Shaheda A Abdin
(74) *Attorney, Agent, or Firm* — ScienBiziP, P.C.

(57) ABSTRACT

An electronic device includes a display screen including a touch display area and a non-touch display area. The electronic device is caused to display, when an application of the electronic device is executed, a first application interface of the application in the touch display area, and generate, when the electronic device receives a first predetermined signal, a second application interface and display the second application interface on the first application interface. The second application interface is displayed adjacent to the non-touch display area. The second application interface includes a number of function buttons respectively corresponding to auxiliary functions. The auxiliary functions include functions corresponding to operating system functions of the electronic device.

16 Claims, 12 Drawing Sheets

AUXILIARY SYSTEM AND METHOD IMPLEMENTED IN ELECTRONIC DEVICE

FIELD

The subject matter herein generally relates to electronic devices, and more particularly to an electronic device implementing an auxiliary system.

BACKGROUND

When an application is used in an electronic device, there may be needs to control functions of the electronic device or of the application during the usage of the application.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
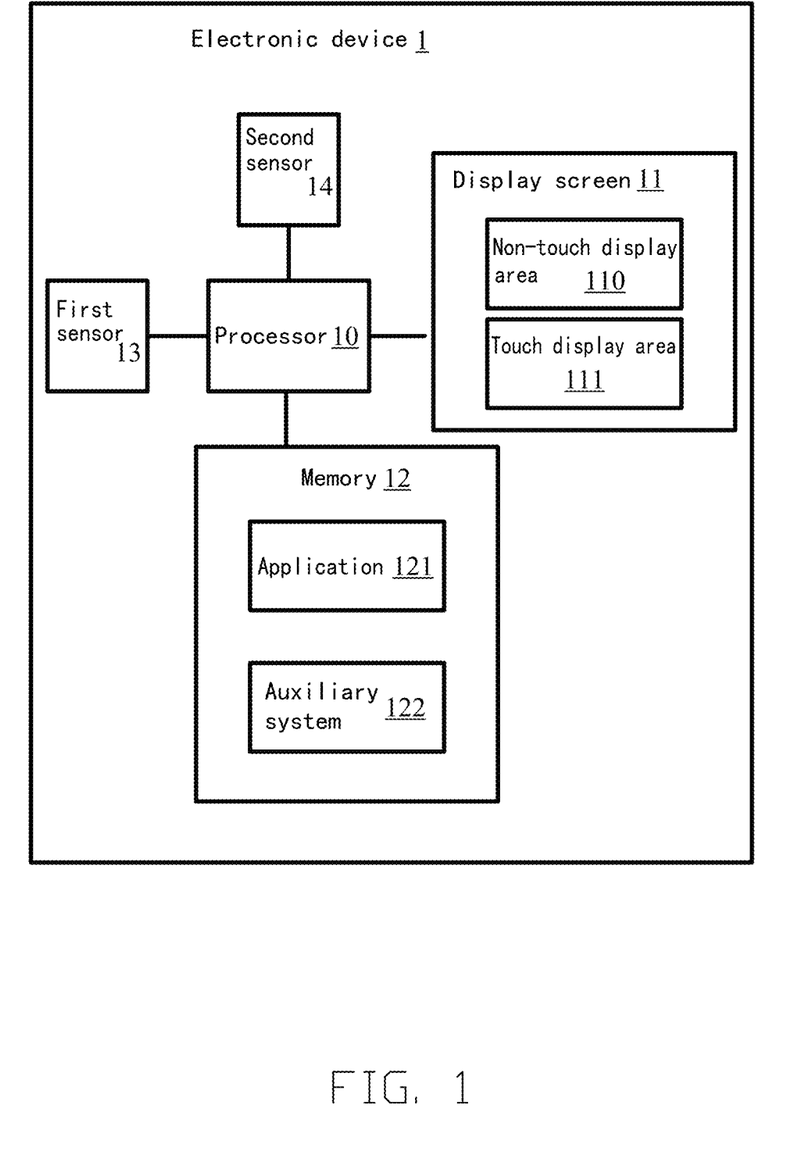
FIG. 1 is a block diagram of an embodiment of an electronic device implementing an auxiliary system.

FIG. 1 illustrates an embodiment of an electronic device 1. The electronic device 1 may be a game device, a mobile phone, a tablet computer, or other electronic device having a display screen. In at least one embodiment, the electronic device 1 includes, but is not limited to, a processor 10, a display screen 11, a memory 12, a first sensor 13, and a second sensor 14. The processor 10, the display screen 11, the memory 12, the first sensor 13, and the second sensor 14 are electrically coupled together.

In at least one embodiment, the display screen 11 includes at least one non-touch display area 110 and a touch display area 111. For example, the display screen 11 may be an irregular shape.

When the non-touch display area 110 has a touch gesture applied thereon, the non-touch display area 110 does not generate a response signal and does not display. The non-touch display area 110 may be designated for installing a camera or other device of the electronic device 1, such as a fingerprint sensor or a distance sensor. An area of the display screen 11 outside of the non-touch display area 110 is designated as a touch display area 111 to allow a user to apply touch gestures thereon. The touch display area 111 generates response signals in response to touch gestures applied thereon. The display screen 11 may be a touch screen.

Figure 2:
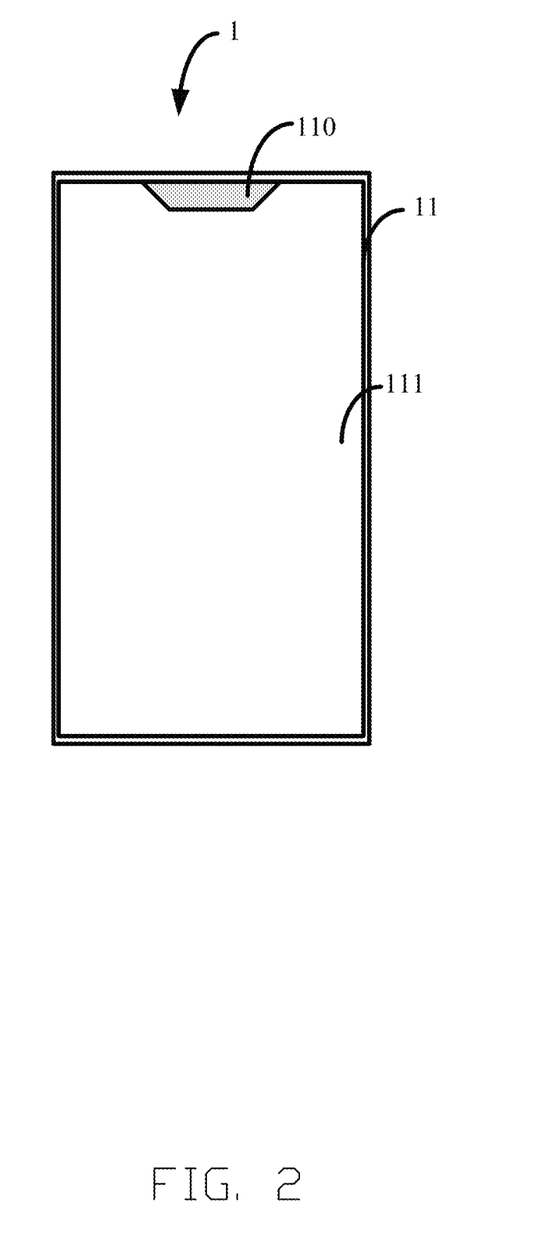
FIG. 2 is a diagram of a display screen of the electronic device in FIG. 1 in a portrait orientation displaying a non-touch display area and a touch display area.

For example, referring to FIG. 2, the non-touch display area 110 is indicated by a trapezoidal grey area. The area outside of the display screen 11 outside of the non-touch display area 110 is the touch display area 111. The non-touch display area 110 can install a camera of the electronic device 1, for example.

Figure 3:
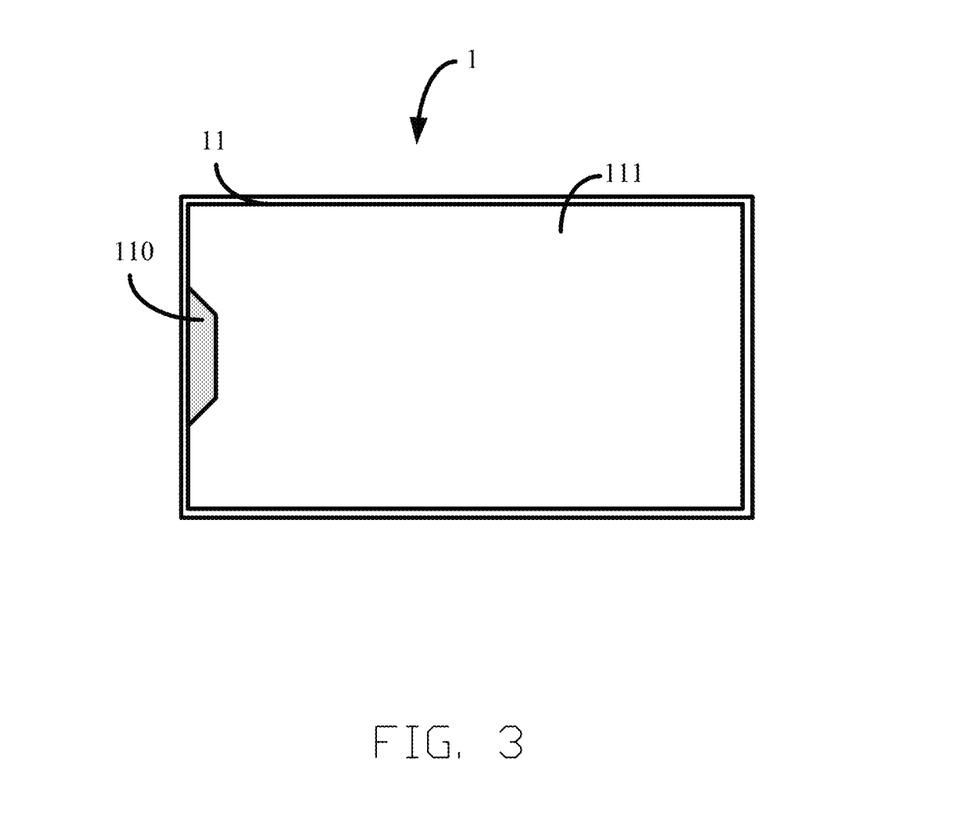
FIG. 3 is a diagram of the display screen of the electronic device in FIG. 1 in a landscape orientation displaying the non-touch display area and the touch display area.

The first sensor 13 detects an orientation of the display screen 11 to be in a portrait orientation or a landscape orientation. For example, when the display screen 11 is placed as illustrated in FIG. 2, the first sensor 13 detects that the display screen 11 is in the portrait orientation. When the display screen 11 is placed as illustrated in FIG. 3, the first sensor 13 detects that the display screen 11 is in the landscape orientation.

In at least one embodiment, the first sensor 13 is a gravitational sensor or a gravitational sensor with another sensor, such as a compass sensor and/or a gyroscope. In at least one embodiment, the first sensor 13 is installed within the electronic device 1.

In at least one embodiment, the second sensor 14 is a touch sensor. The second sensor 14 detects a position of the non-touch display area 110 on the display screen 11.

In at least one embodiment, the second sensor 14 detects the position of the non-touch display area 110 on the display screen 11 according to a touch operation on the display screen 11 set by a user. For example, the touch operation set by the user may be the user applying a sliding touch gesture along a whole surface of the display screen 11. Because the non-touch display area 110 does not generate response signals in response to a touch operation and the touch display area 111 does generate response signals, the second sensor 14 is able to detect the position of the non-touch display area 110 on the display screen 11.

The memory 12 stores a plurality of software programs and data of a plurality of applications 121 and an auxiliary system 122 of the electronic device 1. The memory 12 may include a read-only memory, a random access memory, a programmable read-only memory, an erasable programmable read-only memory, a one-time programmable read-only memory, an electrically-erasable programmable read-only memory, a compact disc read-only memory, or other disk storage device, magnetic storage device, magnetic tape storage device, or other portable storage medium.

In at least one embodiment, the auxiliary system 122 assists a user during operation of the applications 121. The applications 121 may be game applications, video broadcasting applications, or audio broadcasting applications, for example. The auxiliary system 122 assists in providing corresponding functions for different kinds of applications 121. For example, when one of the applications 121 in use is a video game application, the auxiliary system 122 provides auxiliary functions for operating the game application.

In at least one embodiment, the processor 10 may include a central processing unit, a microprocessing unit, a data processing chip, or graphics processing chip, or other control chip module. The processor 10 can execute the plurality of instructions stored in the memory 12 to implement functions of the auxiliary system 122 to provide auxiliary functions for operating the corresponding applications 121.

Figure 4:
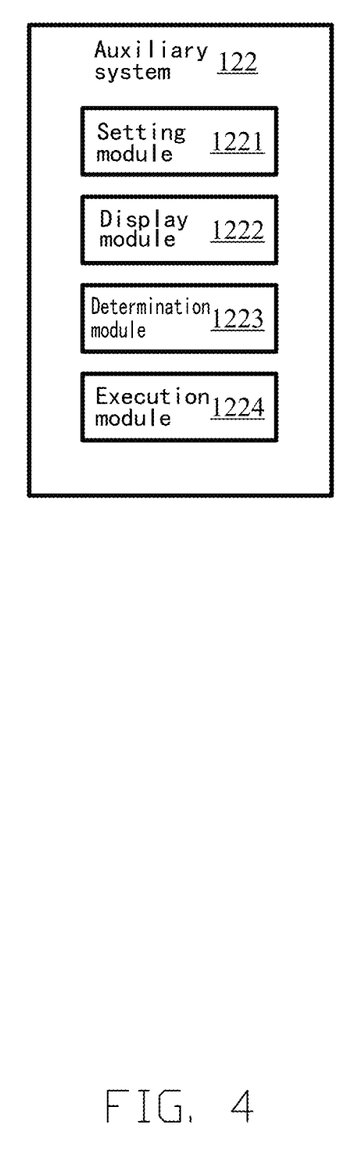
FIG. 4 is a block diagram of function modules of the auxiliary system in FIG. 1.

In at least one embodiment, the auxiliary system 122 includes a plurality of modules stored in the memory 12 and executed by the processor 10. Referring to FIG. 4, the plurality of modules include a setting module 1221, a display module 1222, a determination module 1223, and an execution module 1224.

Figure 5:
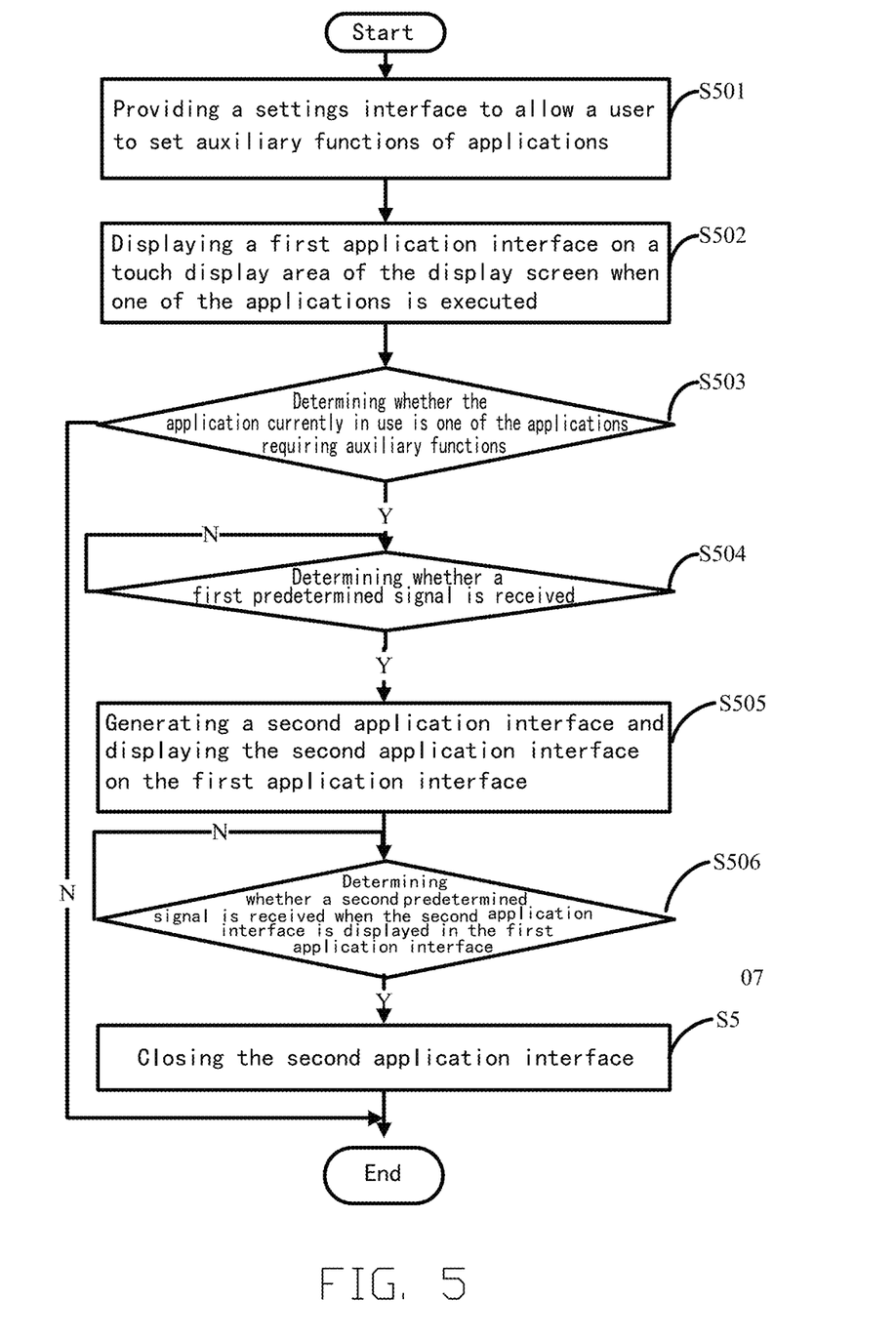
FIG. 5 is a flowchart of an auxiliary method.

FIG. 5 illustrates a flowchart of an auxiliary operation method. The embodiment is provided by way of example, as there are a variety of ways to carry out the method. The method described below can be carried out using the configurations illustrated in FIGS. 1-4, for example, and various elements of these figures are referenced in explaining the embodiment. Each block shown in FIG. 5 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. The embodiment can begin at block S501.

At block S501, the setting module 1221 provides a settings interface to allow a user to set the auxiliary functions of the applications 121.

In at least one embodiment, the setting module 1221 displays a settings interface including a list of names of each application installed in the electronic device 1, such as a game application, a video broadcasting application, and an audio broadcasting application. A user is able to select an application 121 for setting auxiliary functions.

In another embodiment, after an application 121 is successfully installed in the electronic device 1, the setting module 1221 confirms whether the application 121 is a game application, a video broadcasting application, or an audio broadcasting application. If the application 121 is a game application, a video broadcasting application, or an audio broadcasting application, the setting module 1221 automatically sets corresponding auxiliary functions of the application 121. In at least one embodiment, the setting module 1221 detects whether the application 121 is a game application, a video broadcasting application, or an audio broadcasting application according to an application type of the application 121.

In at least one embodiment, the auxiliary functions include functions corresponding to operating system functions of the electronic device 1. The functions corresponding to operating system functions of the electronic device 1 include, but are not limited to, "network acceleration", "background acceleration", "smart acceleration", "immersion mode", "blocking navigation", and "screen capture". The "network acceleration" function refers to increasing a network speed of the electronic device 1. The "background acceleration" function refers to closing background applications running in the electronic device 1. The "smart acceleration" function refers to increasing a frequency of a CPU of the electronic device 1. The "immersion mode" function may include three levels, such as a first level for not blocking any functions of the electronic device 1, a second level for only blocking text message and notification messages and not blocking incoming calls, and a third level for blocking all incoming calls, text messages, and notification messages. The "blocking navigation" function refers to shutting off navigation buttons of the electronic device 1, such as a home button, a back button, or the like, to prevent accidental operation of the navigation buttons during use of the application 121. The "screen capture" function refers to capturing display images of the application 121.

In at least one embodiment, the auxiliary functions further include functions corresponding to application functions of the applications 121, such as "fast closing" and "fast opening". The "fast closing" function refers to quickly closing the application 121, such as by setting a button to quickly close the application 121. The "fast opening" function refers to quickly opening the application 121, such as by setting a button for quickly opening the application 121.

The setting module 1221 stores the settings set by the user in the memory 12. For example, when the user sets a game application as an application requiring auxiliary functions, the setting module 121 stores the name of the game application in the memory 12.

In at least one embodiment, when the user sets an application 121 to require auxiliary functions, the setting module 1221 displays the auxiliary functions in the settings interface to allow the user to further set the auxiliary functions. For example, when the user sets a game application as an application requiring auxiliary functions, the setting interface 1221 lists the functions "network acceleration", "background acceleration", "smart acceleration", "immersion mode", "blocking navigation", "screen capture", "fast closing", and "fast opening" in the settings interface to allow a user to select to set for the game application. The setting module 1221 stores the auxiliary functions set for the application 121 in the memory 12. In at least one embodiment, the setting module 1221 stores the names of the applications 121 requiring auxiliary functions in a list. For example, the setting module 1221 records that the game application requires the auxiliary functions "network acceleration", "background acceleration", "smart acceleration", "immersion mode", "blocking navigation", and "screen capture".

At block S502, when the electronic device 1 executes one of the applications 121, the display module 1222 displays a first application interface 111A (shown in FIG. 6) on the touch display area 111 of the display screen 11.

Figure 6:
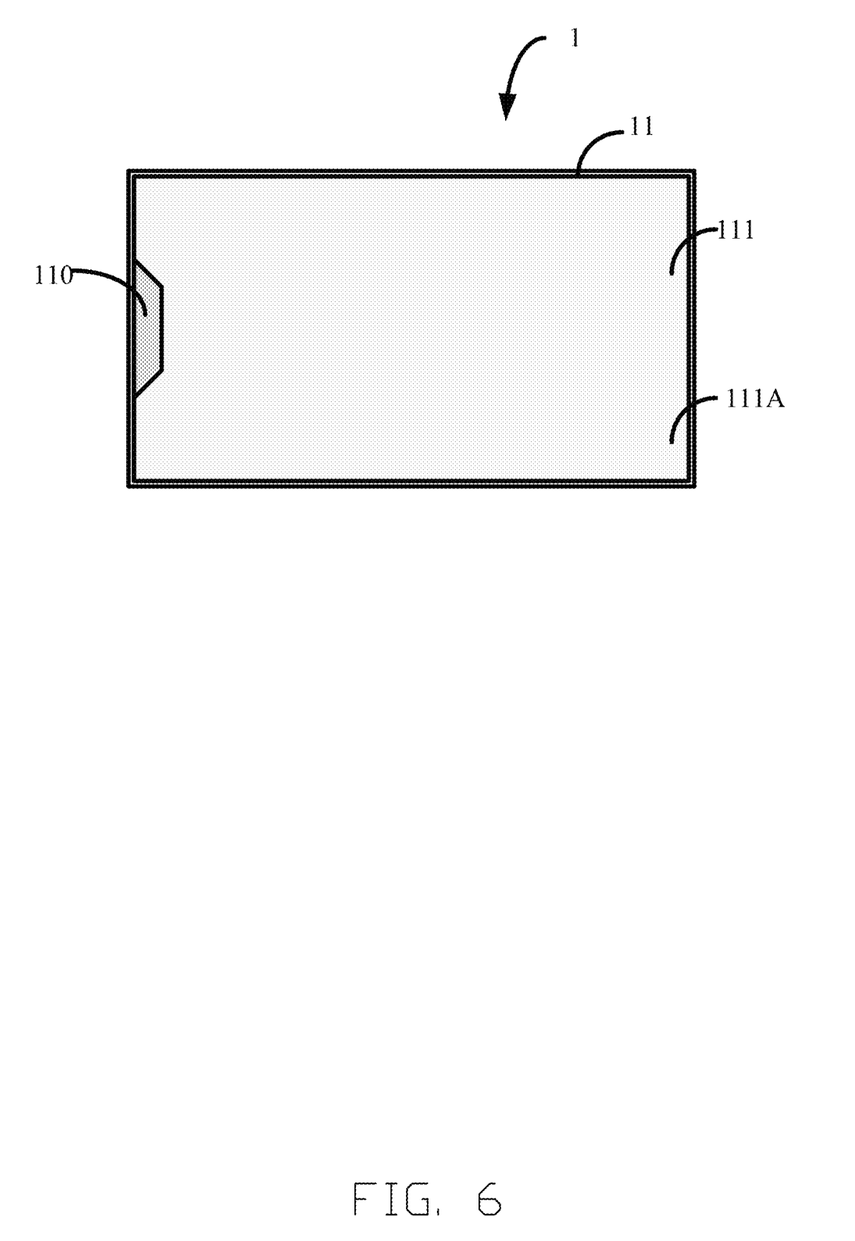
FIG. 6 is a diagram of the display screen in the landscape orientation displaying a first application interface in the touch display area.

The first application interface 111A is a normal interface of the application 121 displayed in the touch display area 111 of the display screen 11.

As described above, in at least one embodiment, the display screen 11 includes the non-touch display area 110 and the touch display area 111.

Referring to FIG. 6, the display module 1222 displays the first application interface 111A in the touch display area 111 of the display screen 11. FIG. 6 illustrates an embodiment where the first application interface 111A is displayed in full screen to fully cover the touch display area 111.

It should be stated that in a first time of executing the auxiliary system 122, the method may begin at block S501. After the first time of executing the auxiliary system 122, block S502 may be directly implemented.

At block S503, the determination module 1223 determines whether the application 121 currently in use is one of the applications 121 requiring auxiliary functions. When the application 121 in use is one of the applications 121 requiring auxiliary functions, block S504 is implemented. When the application 121 in use is not one of the applications 121 requiring auxiliary functions, the method ends.

In detail, the determination module 1223 searches the list of names of the applications 121 stored in the memory 12 to determine whether the application 121 in use requires auxiliary functions.

At block S504, the determination module 1223 further determines whether the electronic device 1 receives a first predetermined signal. When the electronic device 1 receives the first predetermined signal, block S505 is implemented. When the electronic device 1 does not receive the first predetermined signal, block S504 is repeated.

Figure 7A:
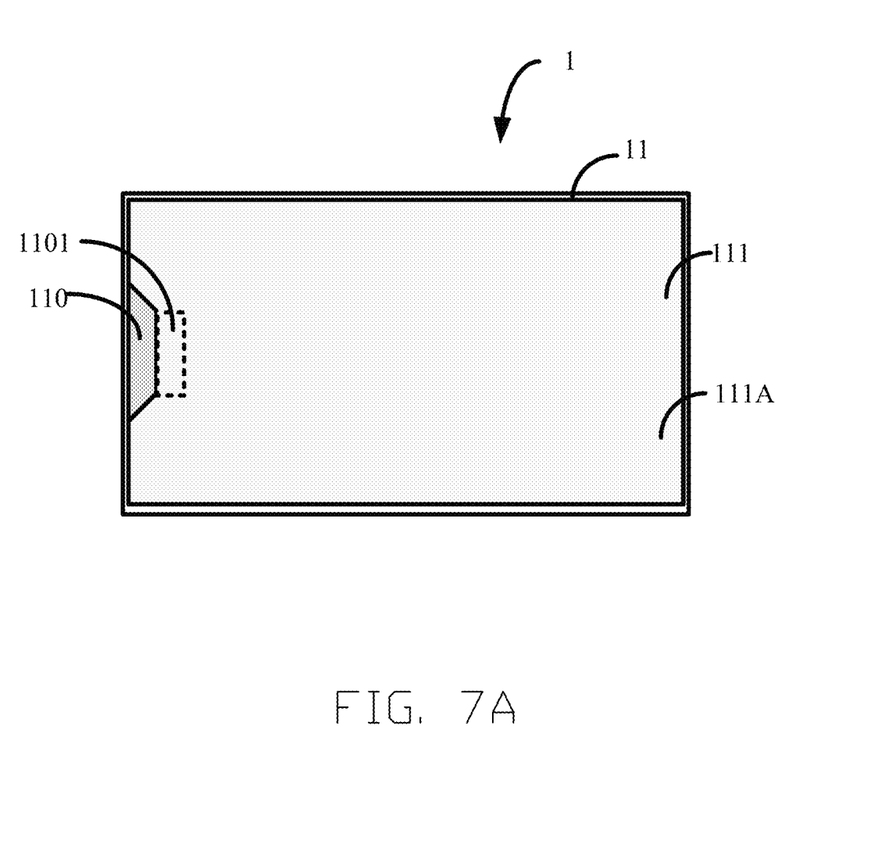
FIG. 7A is a diagram of the display screen in the landscape orientation indicating a position of a predetermined area of the touch display area.

In at least one embodiment, the first predetermined signal includes a first operation signal and a second operation signal received after receiving the first operation signal. The first operation signal is a sliding touch signal originating in a predetermined area 1101.

The predetermined area 1101 includes a predefined size, such as 20 mm². In at least one embodiment, the predetermined area 1101 is located in the touch display area 111 and adjacent to the non-touch display area 110. The predetermined area includes at least one edge having a same length as the non-touch display area 110 and overlapping with the non-touch display area 110.

In at least one embodiment, the predetermined area 1101 is a rectangular area defined from the edge of the non-touch display area 110 to a predefined distance away from the non-touch display area 110 (such as 2 mm).

For example, referring to FIG. 7A, in the landscape orientation, the predetermined area 1101 is a rectangular area of the touch display area 111 adjacent to the non-touch display area 110. The predetermined area 1101 has at least one common edge with the non-touch display area 110 and having the same length as the edge of the non-touch display area 110. The first operation signal is a sliding touch gesture originating in the predetermined area 1101 sliding from left to right.

Figure 7B:
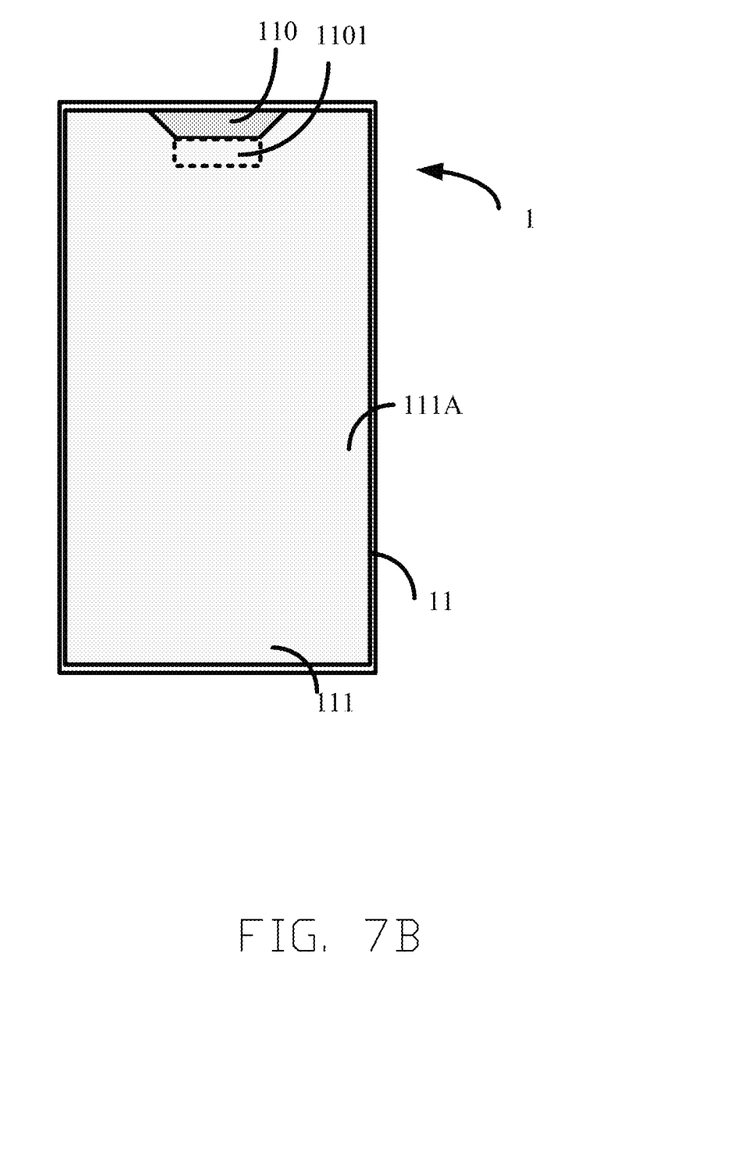
FIG. 7B is a diagram of the display screen in the portrait orientation indicating a position of the predetermined area of the touch display area.

Referring to FIG. 7B, in the portrait orientation, the predetermined area 1101 is a rectangular area of the touch display area 111 adjacent to the non-touch display area 110. The first operation signal is a sliding touch gesture originating in the predetermined area 1101 sliding from top to bottom.

Figure 7C:
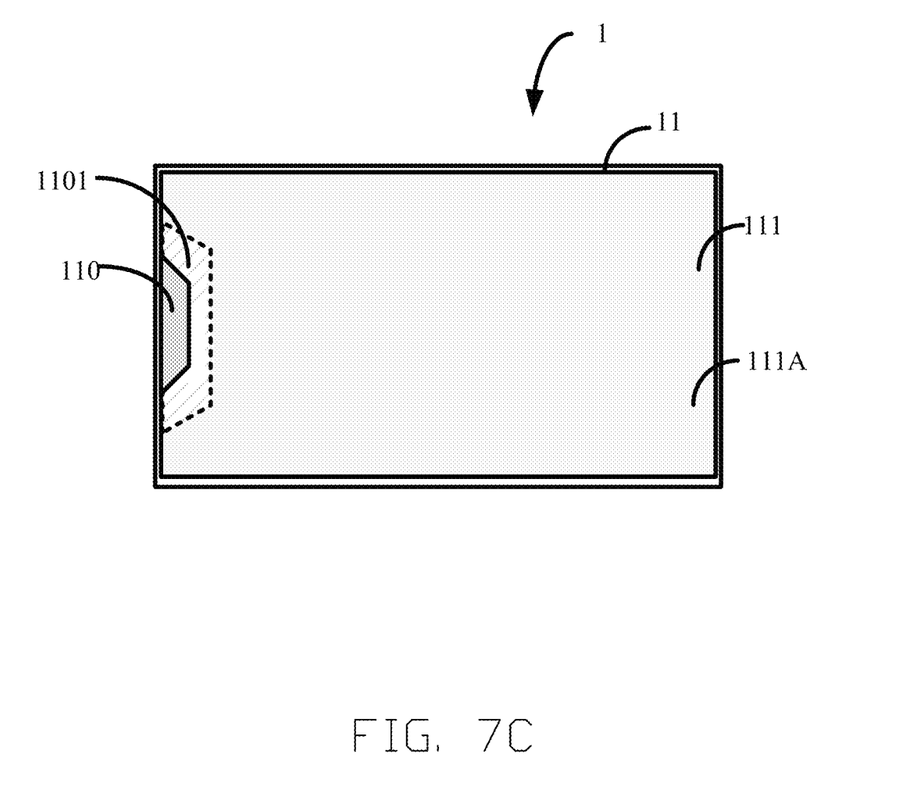
FIG. 7C is a diagram of the display screen in the landscape orientation indicating the position of the predetermined area of the touch display area according to another embodiment.

In another embodiment, referring to FIG. 7C, the predetermined area 1101 is an area defined from three edges of the non-touch display area 110 to a predefined distance (such as 2 mm) away from each of the three edges of the non-touch display area 110. Thus, the predetermined area 1101 surrounds the non-touch display area 110.

In at least one embodiment, when the electronic device 1 receives the first operation signal, the display module 1222 displays a prompt in the first application interface 111A. The prompt notifies a user that the electronic device 1 provides auxiliary functions for the application 121. In at least one embodiment, the display module 1222 displays the prompt in a prompt interface. For example, referring to FIG. 8A, in the landscape orientation, the display module 1222 displays the auxiliary functions in the prompt interface 1102. In at least one embodiment, when the prompt is provided to the user, the display module 1222 displays the prompt interface 1102 in the first application interface 111A. The prompt interface 1102 is displayed adjacent to the non-touch display interface 110.

Figure 8A:
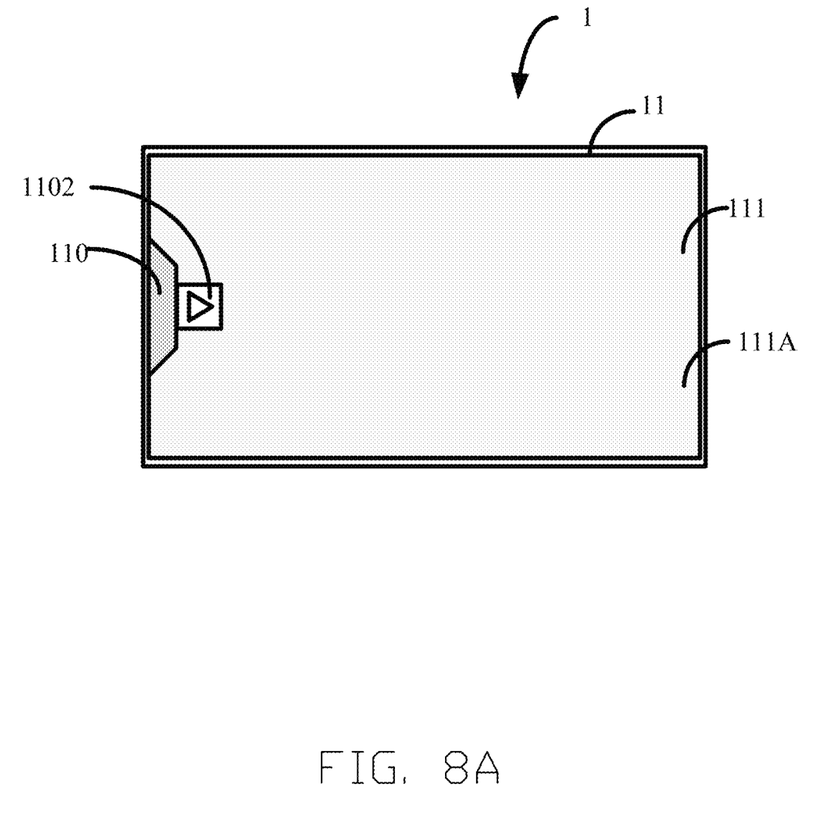
FIG. 8A is a diagram of the display screen in the landscape orientation displaying a second application interface on the first application interface.
Figure 8B:
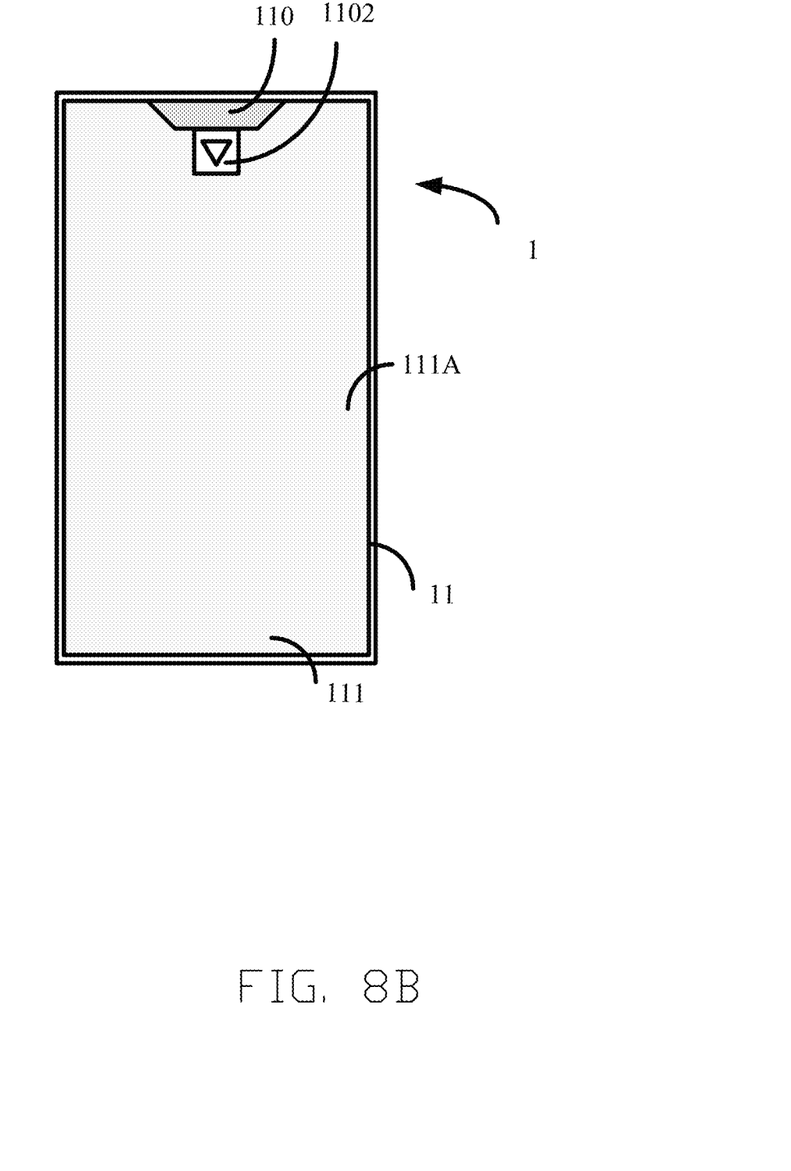
FIG. 8B is a diagram of the display screen in the portrait orientation displaying the second application interface on the first application interface.

Referring to FIG. 8B, in the portrait orientation, the display module 1222 displays the prompt interface 1102 in the first application interface 111A. The prompt interface 1102 is displayed adjacent to the non-touch display interface 110.

In at least one embodiment, the second operation signal is a touch signal, click signal, or sliding touch signal generated in the prompt interface 1102. In another embodiment, the second operation signal is a next sliding touch signal originating in the predetermined area 1101 received by the electronic device 1 after the prompt interface 1102 is displayed in the touch display area 111.

In another embodiment, when block S503 determines that the application 121 requires auxiliary functions, the display module 1222 displays a text prompt in the touch display area 111 to notify the user that auxiliary functions are provided for the application 121, and further notify the user how to operate the first operation signal. In at least one embodiment, the first operation signal is a sliding tough signal originating in the predetermined area 1101 received by the electronic device 1, and the second operation signal is a next sliding touch signal or touch signal originating in the predetermined area 1101 received by the electronic device 1 after a predetermined time duration (such as one second) after receiving the first operation signal.

At block S505, when the electronic device 1 receives the first predetermined signal, the display module 1222 generates a second application interface and displays the second application interface on the first application interface 111A. In at least one embodiment, the second application interface is adjacent to the non-touch display interface 110. In at least one embodiment, the second application interface shares a common edge with the non-touch display interface 110.

In at least one embodiment, when the display module 1222 displays the second application interface, the display module 1222 closes the prompt interface 1102 and does not display the prompt interface 1102 in the touch display area 111.

In at least one embodiment, the display module 1222 generates the second application interface according to the auxiliary functions set by the user at block S501. Buttons of the auxiliary functions are displayed in a list in the second application interface. In at least one embodiment, an edge of the second application interface 1103 completely overlaps the edge of the non-touch display area 110.

Figure 9:
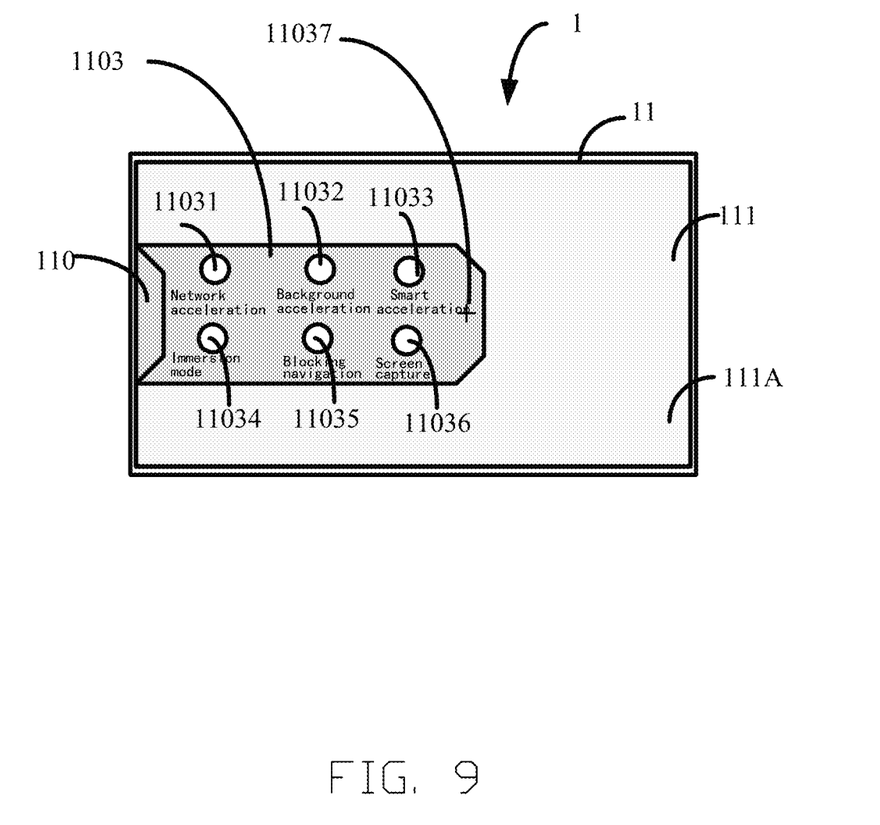
FIG. 9 is a diagram of the display screen in the landscape orientation displaying a plurality of buttons of auxiliary functions in the second application interface.

For example, referring to FIG. 9, when the user sets six auxiliary functions "network acceleration", "background acceleration", "smart acceleration", "immersion mode", "blocking navigation", and "screen capture", the display module 1222 displays the buttons of the six auxiliary functions 11031-11036 in a list in the second application interface 1103 to allow the user to select.

In at least one embodiment, when the user sets only some of the auxiliary functions for the application 121, the display module 1222 further displays an "add" button in the second application interface 1103 to allow the user to add more auxiliary functions. For example, if the user selects the "add" button 11037, the user may add the auxiliary function "quickly close" or "quickly open" to the second application interface 1103.

The execution module 1224 executes the corresponding auxiliary function according to a user selection.

For example, the touch display area 111 of the display screen 11 displays a navigation buttons (such as the home button). When the user selects the "block navigation" button 11035, the execution module 1224 controls the electronic device 1 to not display the navigation button or not to respond to touching the navigation button. When the navigation button is not displayed in the touch display area 111, the execution module 1224 does not execute a corresponding function of the navigation button.

At block S506, when the second application interface is displayed in the first application interface 111A, the determination module 1223 determines whether the electronic device 1 receives the predetermined second signal. When the electronic device 1 receives the second predetermined signal, block S507 is implemented. When the electronic device 1 does not receive the second predetermined signal, block S506 is repeated.

In at least one embodiment, the second predetermined signal refers to a sliding touch signal generated in response to a sliding touch gesture applied in the second application interface. In at least one embodiment, a sliding direction of the second predetermined signal is opposite to a sliding direction of the first operation signal. For example, the second predetermined signal refers to a sliding touch gesture applied in the second application interface sliding from right to left.

In another embodiment, the second predetermined signal refers to any touch signal originating in the touch display area 111 outside of the second application interface.

At block S507, when the electronic device receives the second predetermined signal, the execution module 1224 closes the second application interface and does not display the second application interface in the first application interface 111A.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
 a display screen, with an irregular shape, comprising a touch display area and a non-touch display area, wherein the non-touch display does not display images, and is installed a camera or sensor;
 a processor; and
 a memory configured to store a plurality of instructions, which when executed by the processor, cause the processor to:
  display, when an application of the electronic device is executed, a first application interface of the application in the touch display area; and
  generate, when the electronic device receives a first predetermined signal, a second application interface and display the second application interface inside of the first application interface, wherein the first predetermined signal comprises a first operation signal, and the first operation signal is a sliding touch signal originating in a predetermined area of the touch display area;
 wherein the predetermined area is adjacent to the non-touch display area and the predetermined area comprises at least one edge having a same length as the non-touch display area and overlapping with the non-touch display area, the predetermined area is an area defined from at least one edge of the non-touch display area to a predefined distance away from the at least one edge of the non-touch display area;
 wherein the second application interface is displayed adjacent to the non-touch display area, and an edge of the second application interface completely overlaps an edge of the non-touch display area;
 the second application interface comprises a plurality of function buttons respectively corresponding to auxiliary functions; and
 the auxiliary functions comprise functions corresponding to operating system functions of the electronic device.

2. The electronic device of amended claim 1, wherein the auxiliary functions further comprise functions corresponding to application functions of the application.

3. The electronic device of amended claim 1, wherein the first predetermined signal further comprises a second operation signal received after receiving the first operation signal.

4. The electronic device of claim 3, wherein when the electronic device receives the first operation signal, the instructions further cause the processor to:
 display a prompt interface on the first application interface; wherein the second operation signal is a touch signal, click signal, or sliding touch signal generated in the prompt interface.

5. The electronic device of amended claim 1, wherein the application is a game application, a video broadcasting application, or an audio broadcasting application.

6. The electronic device of amended claim 1, wherein the instructions further cause the processor to:
 provide a settings interface to allow setting the auxiliary functions of the applications, wherein the auxiliary functions comprise functions corresponding to the application functions of the application.

7. The electronic device of amended claim 1, wherein the second application interface comprises a button to allow adding auxiliary functions.

8. The electronic device of amended claim 1, wherein an edge of the second application interface completely overlaps an edge of the non-touch display area.

9. An auxiliary operation method implemented in an electronic device comprising a display screen, with an irregular shape, comprising a touch display area and a non-touch display area, wherein the non-touch display area does not display images, and is installed a camera or sensor, the method comprising:
    displaying, when an application of the electronic device is executed, a first application interface of the application in the touch display area; and
    generating, when the electronic device receives a first predetermined signal, a second application interface and displaying the second application interface inside of the first application interface, wherein the first predetermined signal comprises a first operation signal, and the first operation signal is a sliding touch signal originating in a predetermined area of the touch display area;
    wherein the predetermined area is adjacent to the non-touch display area and the predetermined area comprises at least one edge having a same length as the non-touch display area and overlapping with the non-touch display area, the predetermined area is an area defined from at least one edge of the non-touch display area to a predefined distance away from the at least one edge of the non-touch display area;
    wherein the second application interface is displayed adjacent to the non-touch display area, and an edge of the second application interface completely overlaps an edge of the non-touch display area;

the second application interface comprises a plurality of function buttons respectively corresponding to auxiliary functions; and
the auxiliary functions comprise functions corresponding to operating system functions of the electronic device.

10. The auxiliary operation method of claim 9, wherein the auxiliary functions further comprise functions corresponding to application functions of the application.

11. The auxiliary operation method of claim 9, wherein the first predetermined signal further comprises a second operation signal received after receiving the first operation signal.

12. The auxiliary operation method of amended claim 11, wherein when the electronic device receives the first operation signal, further comprising:
    displaying a prompt interface on the first application interface; wherein the second operation signal is a touch signal, click signal, or sliding touch signal generated in the prompt interface.

13. The auxiliary operation method of claim 9, wherein the application is a game application, a video broadcasting application, or an audio broadcasting application.

14. The auxiliary operation method of claim 9, further comprising:
    providing a settings interface to allow setting the auxiliary functions of the applications, wherein the auxiliary functions comprise functions corresponding to the application.

15. The auxiliary operation method of claim 9, wherein the second application interface comprises a button to allow adding auxiliary functions.

16. The auxiliary operation method of claim 9, wherein an edge of the second application interface completely overlaps an edge of the non-touch display area.

* * * * *